United States Patent [19]
Outlaw et al.

[11] 3,955,303
[45] May 11, 1976

[54] FISHING ROD

[76] Inventors: James Raymond Outlaw, Rte. 4, Box 413, Hillsborough, N.C. 27278; Lewis H. Gardner, 1305 Gardner St., Box 283, Camden, S.C. 29020

[22] Filed: Feb. 5, 1975

[21] Appl. No.: 547,216

[52] U.S. Cl. .............................................. 43/19.2
[51] Int. Cl.² ........................................ A01K 87/00
[58] Field of Search ............ 43/19.2, 24, 26.1, 26.2

[56] References Cited
UNITED STATES PATENTS

| | | | |
|---|---|---|---|
| 303,347 | 8/1884 | Wakeman | 43/19.2 |
| 1,401,096 | 12/1921 | Neudeck | 43/19.2 |
| 1,465,707 | 8/1923 | Bartholomew | 43/19.2 |
| 2,169,698 | 8/1939 | Lancaster | 43/19.2 |
| 2,484,727 | 10/1949 | Patterson | 43/24 |
| 2,782,648 | 2/1957 | McClellan | 43/19.2 |
| 3,465,464 | 9/1969 | De Berry | 43/19.2 |

*Primary Examiner*—Warner H. Camp
*Attorney, Agent, or Firm*—Bailey & Dority

[57] ABSTRACT

A fishing rod has a plurality of telescoping sections with a central concentric bore extending therethrough, a handle member carried by one end of the rod, a hollow-core cable extending through the central bore of the rod, a rotatable braided wire carried in the hollow core of the cable extending outwardly therefrom having a snap hook carried on one end for connecting a fishing hook and bait thereto, and an electric motor connected to a source of D. C. power carried in the handle member having a rotating shaft connected to the braided wire so as to rotate the braided wire and the fishing bait connected thereto.

2 Claims, 2 Drawing Figures

FISHING ROD

BACKGROUND OF THE INVENTION

It has been found that for bank fishing and still fishing out of a boat, using crickets, worms, and other similar fishing baits that it is desirable to impart movement to the bait periodically. The movement provided by the present invention simulates, for example, the wiggling motion of a live worm or the kicking motion of a live cricket which attracts the fish.

Heretofore, it has been common to raise the tip of a pole thus moving the bait up and down vertically or to move the tip of the pole laterally to impart some lateral wiggling of the bait, or some combination of the two motions. However, the motion which most correctly simulates the natural motion of a live worm or cricket and the like is an intermittent rotational motion causing the parts of the fishing bait which are attached loosely to the fishing hook to kick or swing outwardly and then fall back in a life-like manner.

SUMMARY OF THE INVENTION

A fishing rod is provided which comprises a multisection, telescoping rod having a central concentric bore extending therethrough with an open end. A handle member is carried by the end of the rod opposite the open end, and a cable extends through the central bore of the rod outwardly from the open end of the bore. The cable has a hollow-core for receiving a rotatable wire therethrough, which extends outwardly from one end of the hollow-core cable exterior of said rod. A connecting means is carried on the exterior end of the wire for connecting a fish hook and bait thereto. The cable and wire carried in the central bore of the rod are received in the handle member and a motor is carried within the handle member having a rotating shaft to which the wire is connected for rotation thereby. A source of D. C. power is connected to the motor and a switch is carried on the handle member connected between the D. C. power source and the motor for selectively energizing the motor whereby the wire is rotated moving the fishing bait in a lifelike manner.

Accordingly, an important object of the present invention is to provide a fishing rod which has a plurality of hollow telescoping sections for carrying a rotatable wire.

Another important object of the present invention is to provide a fishing rod having a plurality of telescoping sections which can be extended for fishing and collapsed thereafter providing for convenient storage and transporting of the rod.

Another important object of the present invention is to provide a fishing rod having a plurality of hollow telescoping sections for carrying a rotatable wire and a small electric motor carried in the handle of the rod for rotating the wire causing the fishing bait connected to the opposite end of the wire to move in a life-like manner creating an attraction for the fish.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

DESCRIPTION OF A PREFERRED EMBODIMENT

Figures 1, 2:
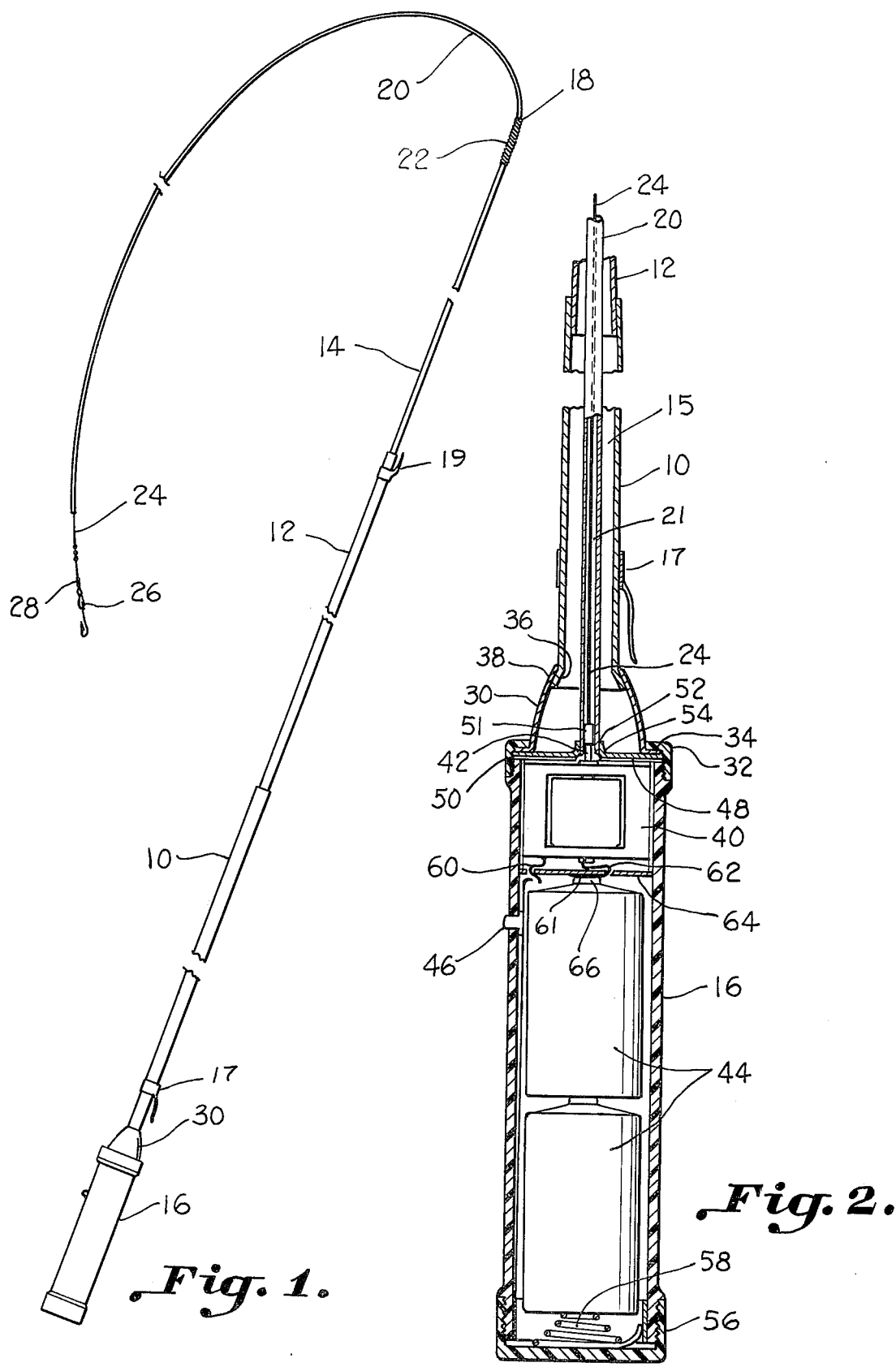
FIG. 1 is a perspective view illustrating a fishing rod constructed in accordance with the present invention which is in an extended position.
FIG. 2 is a cut-away, partially sectioned view of the fishing rod of FIG. 1 illustrating the handle portion with parts of the rod omitted.

A preferred form for the fishing rod of the present invention is best seen in FIG. 1 and comprises a plurality of telescoping sections 10, 12, and 14. The rod section 10 is the base section and is attached to the handle member 16. The intermediate section 12 is slideably nested in the base section 10, and the tip or end rod section 14 is slideably nested in the intermediate section 12. All of the rod sections cooperate with each other and slide with respect to each other in a telescoping manner. With the rod sections fully extended, the fishing rod has an overall length of approximately 12 feet. The rod sections telescope within each other or collapse into a rod which has an overall length of approximately 5 feet for easy storage and convenient transportation of the fishing rod in an automobile. The rod sections 10, 12, and 14 are preferably constructed of fiberglass and have hollow interiors providing a central concentric bore 15 extending therethrough.

The end section 14 of the fishing rod has an open end 18 through which a hollow core cable 20 extends. Provided on the tip of the end section 14 is a hollow flexible spring member which is mounted over the open end of the rod section providing a flexible bushing for the cable that extends therethrough. Carried in the hollow core 21 of the cable 20 is a rotatable wire 24. The flexible bushing alleviates bending of the cable 20 and wire 24 which would otherwise possibly occur if the cable and wire carried therein were allowed to bend over a sharp edge of the opening in the end of the tip section 14. The wire 24 may be any suitable flexible member which can carry a torque and transmit a rotational motion while still retaining its flexibility. In a preferred embodiment the wire 24 is a small, finely braided wire, and the cable 20 may be formed of a flexible plastic material. The hollow-core cable 20 and the rotatable wire 24 carried therethrough extend through the central concentric bore 15 formed through the interior of the telescoping rod sections into the handle member. A pair of clip members 17 and 19 are carried on the rod sections 10 and 12, respectively, for winding the cable 20 and wire 24 therearound when the rod is collapsed.

A connecting means is provided by a conventional swiveled snap hook 26 fastened to the end of the wire 24 which extends through an open end of the cable member 20 for attaching thereto a fishing hook and bait. The snap hook may be connected to the wire 24 in any suitable manner such as by looping the wire through an eye of the snap hook and then crimping the wire together in a permanent manner using a small split collar member 28.

The base section 10 of the fishing rod is attached to the handle member by use of a tapered collar member 30 which is attached to the handle member by securing a threaded coupling member 32 over an integral flange portion 34 of the tapered coupling member 30 onto a threaded end of the handle member 16. An outwardly extending flange portion 36 of the base rod section 10 engages the tapered neck portion 38 of the tapered collar member 30 and is affixed thereat in any suitable manner as by gluing and the like, or the tapered collar member 30 and the base rod section 10 may be formed as one piece.

Referring now in detail to FIG. 2, an electric motor 40 is carried within the handle member 16 and has a rotating shaft 42 extending outwardly therefrom. The electric motor is connected to a pair of battery cells 44 in a conventional manner. A pushbutton switch 46 is provided for energizing the battery when depressed. The wire 24 is connected to the rotating shaft 42 in any suitable manner such as by crimping the wire thereto using a small collar member 51 which is squeezed tightly on the end of the shaft 42 and then crimped and squeezed about the braided wire 24 or the braided wire may be welded thereto.

A disc member 48 covers the electric motor preventing water from contacting the motor and power source through the central concentric bore 15 extending through the rod. The disc 48 may be fastened into place by placing it between the upper shoulder 50 of an end of the handle member and the bottom of the circular flange 34 carried on the tapered collar member 30. The disc 48 may also be formed as one piece with the tapered collar member 30. The disc 48 has a central aperture 52 defined by an upwardly extending collar member 54 which receives an end of the hollow-core cable 20 therein. In this manner the hollow-core cable 20 is fastened in place within the handle member 16 and the cable 20 may be further secured within the collar member 54 as by gluing and the like. The handle member has a threaded bottom cap 56 which may be removed in order to replace the battery cells 44. A tapered helical coil spring 58 is provided in the bottom of the cap 56 for making electrical contact with the bottom of the battery cells 44 and is connected through the pushbutton switch 46 to the electric motor connecting wire 60. The circuit is completed by a conducting wire 62 electrically connected to the electric motor and to the other end of the battery cells 44. A circular electrical conductor member 61 may be formed on the separator plate 64 with the conductor wire 62 fastened thereto for engaging the nipple end 66 of the battery cell in the conventional manner.

Thus, it can be seen that a unique and efficient fishing rod is provided which has a rotatable fishing wire and an electric motor for rotating the fishing wire so that the fishing bait connected to one end of the wire is moved in a life-like manner creating an attraction for the fish. The electric motor may be energized in an intermittent fashion or any other desired fashion to impart the life-like motion to the fishing bait. The fishing rod may be extended to its full length of approximately 12 feet when fishing from the bank or when fishing out of a boat to reach the desired location for fishing and to remove the fishing bait from the noise of the electric motor and the noise of the person fishing. When not fishing the fishing rod may be collapsed into a compact size of approximately 5 feet for easy storage and transportation. The rotating line is carried in a hollow-core cable which protects the wire preventing it from being bent and from being twisted and entangled within the central bore of the fishing rod.

The hollow core cable provides a smooth bearing within which the wire may rotate at all times during operation. The combination of the hollow-core cable 20 and the very finely braided wire 24 provide a flexible fishing line of a weight and flexibility similar to that of the fly fishing line.

While a preferred embodiment of the invention has been described using specific terms, such description is for illustrative purposes only, and it is to be understood that changes and variations may be made without departing from the spirit or scope of the following claims.

What is claimed is:

1. A fishing rod comprising:
  a multi-section rod having a central bore extending therethrough with an open end,
  a handle member carried by the end of said rod opposite said open end,
  a flexible cable extending through said central bore and outwardly from said open end of said bore having a hollow core, said cable having one end received in said handle member,
  a rotatable wire carried in said hollow core of said cable extending outwardly from one end of said hollow core, connecting means carried on one end of said wire for connecting a fishing hook and bait thereto, said wire extending at an end opposite said connecting means, into said handle member,
  motor means carried by said handle member having a rotating shaft,
  a source of D. C. power connected to said motor means,
  means connecting said wire to said rotating shaft for rotation thereby, (and)
  said rod including a hollow flexible spring member carried on the end opposite said handle member providing a flexible bushing for said cable and said wire carried therethrough preventing bends from being formed therein, and
  a switch carried on said handle member connected between said D. C. power source and said motor means for selectively energizing said motor means whereby said wire is rotated so as to move the fishing bait in a life-like manner creating an attraction for the fish.

2. The apparatus of claim 1 wherein said rod comprises a plurality of telescoping elongated sections and said central bore extends concentrically therethrough.

* * * * *